US012115894B2

(12) United States Patent
Mpakaris et al.

(10) Patent No.: US 12,115,894 B2
(45) Date of Patent: Oct. 15, 2024

(54) TABLE DEVICE AND VEHICLE

(71) Applicant: Mercedes-Benz Group AG, Stuttgart (DE)

(72) Inventors: Georgios Mpakaris, Stuttgart (DE); Benno Stamp, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 194 days.

(21) Appl. No.: 17/766,140

(22) PCT Filed: Sep. 25, 2020

(86) PCT No.: PCT/EP2020/076844
§ 371 (c)(1),
(2) Date: Apr. 1, 2022

(87) PCT Pub. No.: WO2021/063809
PCT Pub. Date: Apr. 8, 2021

(65) Prior Publication Data
US 2022/0363178 A1 Nov. 17, 2022

(30) Foreign Application Priority Data
Oct. 2, 2019 (DE) ..................... 10 2019 006 897.1

(51) Int. Cl.
*B60N 3/10* (2006.01)
*B60N 3/00* (2006.01)

(52) U.S. Cl.
CPC ............. *B60N 3/102* (2013.01); *B60N 3/002* (2013.01)

(58) Field of Classification Search
CPC ........ B60N 3/102; B60N 3/002; B60N 3/004; B64D 11/0638; A47B 31/06; A47B 21/00; A47B 2200/008
(Continued)

(56) References Cited

U.S. PATENT DOCUMENTS 1,790,468 A * 1/1931 Frank et al. ............. A47B 5/04
108/134
2,132,279 A * 10/1938 Wicknick ............... B60N 3/004
297/146
(Continued)

FOREIGN PATENT DOCUMENTS

CN 106043071 A 10/2016
CN 208180847 U 12/2018
(Continued)

OTHER PUBLICATIONS

PCT/EP2020/076844, International Search Report dated Nov. 25, 2020 (Two (2) pages).
(Continued)

*Primary Examiner* — Jose V Chen
(74) *Attorney, Agent, or Firm* — Crowell & Moring LLP

(57) ABSTRACT

A table device for an interior of a vehicle includes a table element that is positionable between a non-use position and a use position where the table element is disposable in a region of an instrument panel of a front passenger of the vehicle. An underside of the table element, in an installed position of the table element in the interior of the vehicle, faces a front passenger seat of the vehicle in the non-use position. The underside of the table element has a tear-resistant microsandwich material. The tear-resistant microsandwich material has a tear-resistant surface and a core that fails in a targeted manner.

10 Claims, 3 Drawing Sheets

(58) Field of Classification Search
USPC .................. 108/44, 45, 48; 297/143, 146
See application file for complete search history.

(56) References Cited

U.S. PATENT DOCUMENTS

| | | | | |
|---|---|---|---|---|
| 2,284,811 | A * | 6/1942 | Ferrelle | B60N 3/004 297/146 |
| 3,062,544 | A * | 11/1962 | Viets | A63B 67/04 108/166 |
| 3,985,374 | A | 10/1976 | Powaska | |
| 4,898,426 | A | 2/1990 | Schulz et al. | |
| 6,758,518 | B2 * | 7/2004 | Ingram | B64D 11/0638 297/DIG. 5 |
| 7,621,593 | B2 * | 11/2009 | Dickinson | B60N 3/004 297/188.05 |
| 8,534,737 | B2 * | 9/2013 | Torres | B60R 5/044 296/37.16 |
| 8,905,470 | B2 * | 12/2014 | Shih | B60N 3/004 297/146 |
| 8,936,308 | B2 * | 1/2015 | Petersen | B60N 3/004 297/146 |
| 9,428,118 | B1 | 8/2016 | Rawlinson | |
| 2002/0140246 | A1 * | 10/2002 | Worrell | B60N 2/26 296/37.8 |
| 2003/0000430 | A1 | 1/2003 | Sepe et al. | |
| 2003/0106469 | A1 * | 6/2003 | Jensen | B64D 11/0638 108/44 |
| 2007/0283855 | A1 * | 12/2007 | Pozzi | A47B 23/043 108/44 |
| 2016/0039524 | A1 * | 2/2016 | Zheng | B64D 11/06 297/173 |
| 2016/0129821 | A1 * | 5/2016 | Hernandez | B61D 33/0007 108/44 |
| 2017/0267184 | A1 | 9/2017 | Huebner et al. | |
| 2018/0339630 | A1 | 11/2018 | Akaike et al. | |
| 2019/0143869 | A1 | 5/2019 | Sequi et al. | |
| 2019/0315258 | A1 * | 10/2019 | Johns | E05D 3/125 |
| 2019/0344696 | A1 * | 11/2019 | Pritchard | B60N 3/005 |
| 2020/0017220 | A1 * | 1/2020 | Wanner | B60R 11/0241 |
| 2020/0070982 | A1 * | 3/2020 | Mayne | B60N 3/002 |
| 2020/0290523 | A1 * | 9/2020 | Pajic | B60N 3/002 |

FOREIGN PATENT DOCUMENTS

| | | |
|---|---|---|
| CN | 110126698 A | 8/2019 |
| DE | 38 11 939 A1 | 10/1989 |
| DE | 10 2007 040 159 A1 | 2/2009 |
| DE | 10 2014 207 451 A1 | 10/2015 |
| DE | 10 2014 223 233 A1 | 5/2016 |

OTHER PUBLICATIONS

German-language German Office Action issued in German application No. 10 2019 006 897.1 dated Jul. 20, 2020 (Seven (7) pages).
German-language German Office Action issued in German application No. 10 2019 006 897.1 dated Dec. 20, 2021 (Six (6) pages).
Chinese-language Chinese Office Action issued in Chinese Application No. 202080065324.7 dated Mar. 21, 2024 (7 pages).

* cited by examiner

TABLE DEVICE AND VEHICLE

BACKGROUND AND SUMMARY OF THE INVENTION

The invention relates to a table device for an interior of a vehicle with a table element which can be positioned from a non-use position into a use position. In addition, the invention relates to a vehicle comprising such a table device.

A table device for a motor vehicle interior is known from DE 10 2014 207 451A1. The table device comprises a table element which can be moved or transferred by means of an adjustment mechanism from a non-use position, i.e., from a stowed position, into a use position, i.e., a functional position. Furthermore, the table device comprises an interior trim element of the motor vehicle interior, wherein the table element in the non-use position is a visible and two-dimensional component of the visible outer contour of the interior trim element.

Furthermore, DE 10 2014 223 233 A1 describes an air-conditioning device for a motor vehicle with at least one rear passenger seat and a front seat which is located in front of the rear passenger seat and has its rear wall facing the rear passenger seat. A footwell surrounded by floor and side walls is arranged between the rear passenger seat and the front seat. The air-conditioning device comprises at least one rear-area climate control element which is integrated into the front seat rear wall and/or the footwell wall and which is designed as a wall surface in the form of an electric temperature control surface.

The object of the invention is to provide an improved table device for an interior of a vehicle and an improved vehicle compared to the prior art.

A table device for an interior of a vehicle has a table element which can be positioned from a non-use position into a use position. In accordance with the invention, the table element is arranged in the region of an instrument panel of a front passenger of the vehicle and at least one underside of the table element facing a front passenger seat in the non-use position comprises a tear-resistant microsandwich material which has a tear-resistant surface with a core that fails in a targeted manner. It is thus designed for collision-related load distribution and energy absorption.

Due to its construction, the table element optimizes occupant protection for the front passenger, as the table element serves as a so-called load distributor, especially in the case of an unbelted load. As the microsandwich material is largely tear-resistant, the risk of sharp broken edges in the region of the front passenger's legs can at least be reduced, so that a load acting on the legs can be reduced.

Due to its structure, the table element is designed in a further development for collision-related load distribution and energy absorption. The table element functions as a load distributor in the event of a vehicle collision, since forces acting from the front passenger on the underside of the table element are distributed, absorbed and dissipated in a controlled manner by the geometric and material design of the underside.

One design of the table device provides that a surface heater is arranged on the underside of the table element. In such a table device, the surface heater is thermally and functionally optimized and integrated into the table element so that heat can be supplied to a front passenger in a relatively energy-saving manner without it being necessary to heat the entire interior of the vehicle. In particular, such a table device is intended for integration into an electric vehicle or a hybrid vehicle, so that electrical energy can be saved by way of the targeted heating, whereby a range of the vehicle can be increased.

For positioning the table element from the non-use position into the use position and back, a circular arc-shaped guide is provided in a possible embodiment, along which guide the table element can be moved by means of a sliding movement.

In particular, the table element is held by means of the guide and secured against falling out and/or slipping out. The circular arc-shaped guide is a comparatively simple way to save space in the interior of the vehicle and to position the table element in the relevant position.

In a further embodiment of the table device, the sliding movement of the table element can be executed manually, manually by means of spring force assistance and/or electromechanically, wherein the positioning of the table element can thus be carried out unhindered and without great effort.

One design of the table element provides that an upper side of the table element has an edge region surrounding a tabletop surface. By means of the edge region, which has at least a predetermined dimension, it can be largely prevented, especially when the vehicle is in motion, that an object placed on the tabletop surface slips off the table element, falls down and is thus damaged.

In one embodiment, at least one electrical and/or electronic interface is integrated into the table element. For example, a mobile terminal can thus be connected to the vehicle by cable for data transmission and/or an electrical energy storage device of a mobile terminal can be charged via the interface, wherein the interface can also represent a connection element for a display unit.

Furthermore, in another possible embodiment, the table element comprises at least one ferromagnetic surface and/or a number of holding elements. By means of the ferromagnetic surface and/or the holding elements, it is possible to fix objects to the table element so that slipping away can be avoided. For example, at least one holding element is designed as a beverage, pen, coin and/or card holder, wherein the holding element in its non-use position is arranged largely non-visibly within the table element.

One design provides that the table element comprises hooks, eyelets and/or recesses as holding elements, by means of which objects can be fixed on and/or to the table element.

In another possible embodiment, an electronic display unit is integrated into an upper side of the table element, wherein the upper side of the table element can be designed, for example, as a touch-sensitive display unit. For this purpose, the upper side can form a touch-sensitive display unit, in particular as required and with an appropriate setting.

Furthermore, the invention relates to a vehicle with a table device comprising a table element which can be positioned from a non-use position to a use position and has a surface heater on its underside.

In particular, the vehicle is an electric vehicle or a hybrid vehicle, wherein it is possible to warm a front passenger by means of a table device designed in this way without it being necessary to heat an entire interior of the vehicle. In this way, a saving of available electrical energy can be achieved.

Exemplary embodiments of the invention will be explained in more detail hereinafter with reference to drawings.

DETAILED DESCRIPTION OF THE DRAWINGS

Corresponding parts are provided with like reference signs in all figures.

Figure 1:
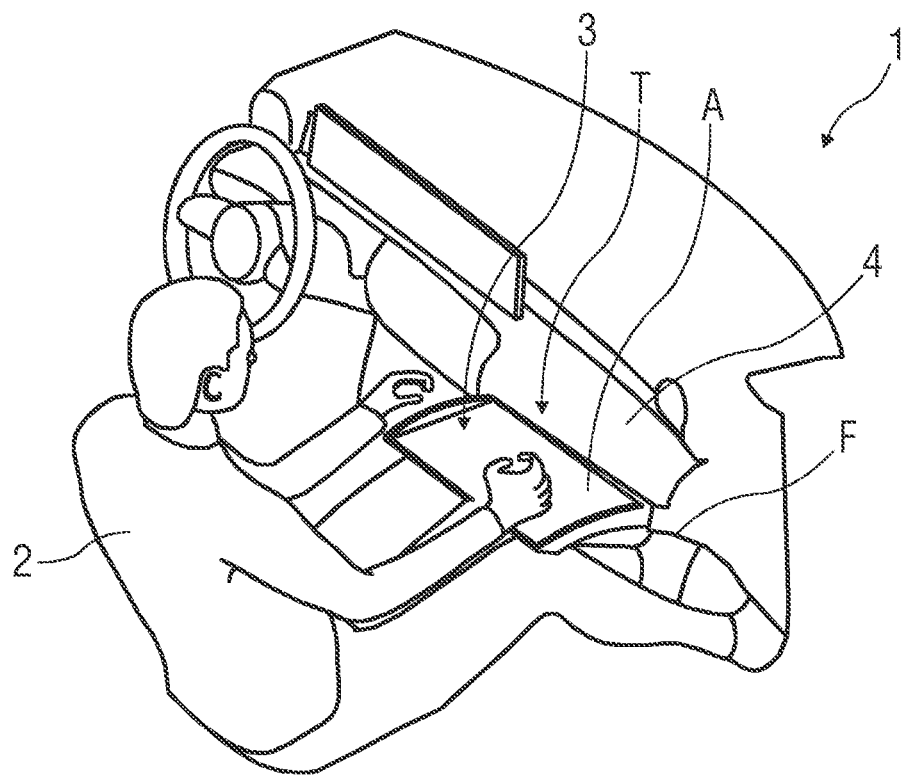
FIG. 1, schematically, is a perspective view of an interior of a vehicle with a front passenger and a table element of a table device positioned in a use position.

FIG. 1 shows a perspective view of an interior of a vehicle 1 with a front passenger 2 and a table element 3 of a table device T positioned in a use position.

Particularly in autonomous driving mode, an occupant of the vehicle 1, for example a front passenger 2, wishes to have extended possibilities for storing objects, but also extended functions.

If the vehicle 1 is an electric vehicle, it is relatively important to supply the occupant, according to the present exemplary embodiment the front passenger 2, with heat in an efficient and targeted manner without it being necessary to heat the entire interior. In this way, the available electrical energy can be used optimally and a range of the vehicle 1 can be increased.

Furthermore, in the event of a collision of the vehicle 1, there is a risk that the legs, in particular the knees, of the front passenger 2, or a knee airbag will be braced against the lower region of an instrument panel 4 and/or a glove compartment.

The table device T described hereinafter is provided in order to create a tabletop surface A for the front passenger 2 and a possibility of a targeted heat supply as well as in order to absorb a kinetic energy of the front passenger 2 resulting from the collision of the vehicle 1, without a further risk of injury.

The table device T is integrated into a region of the instrument panel 4 on a front passenger side instead of, or, if sufficient installation space is available, instead of a glove compartment.

Figure 4:
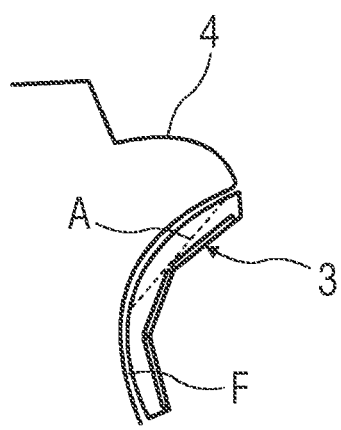
FIG. 4, schematically, is a sectional view of a side view of the instrument panel with the table element positioned in a non-use position.

The table element 3 can be positioned by means of an arc-shaped guide F from a non-use position shown in FIG. 4 into the use position. The table element 3 can be moved here along the arc-shaped guide F by means of a sliding movement. The sliding movement can be effected by means of manual force, i.e., manually, manually by means of spring force assistance and/or electromechanically. Alternatively or additionally, the positioning can also be carried out by means of other suitable devices and/or methods.

In the use position, the table element 3 is positioned above the knees of the front passenger 2, largely independent of his or her height.

Figure 2:
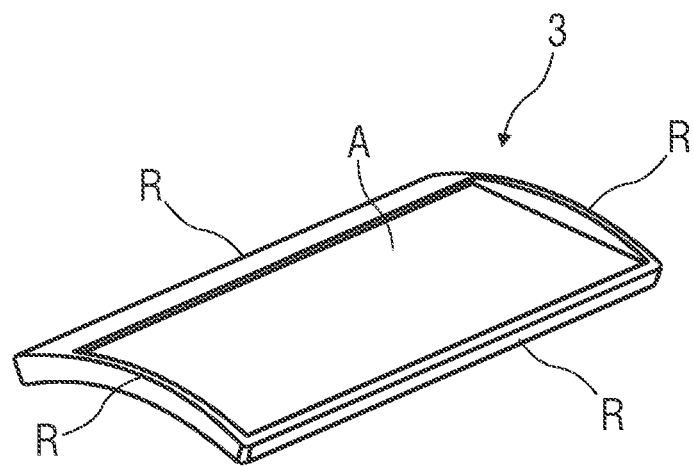
FIG. 2, schematically, is a perspective view of the table element.

A perspective view of the table element 3 is shown in FIG. 2.

The table element 3 has a curved underside corresponding to the circular arc-shaped guide F by means of which the table element 3 can be guided and held. An upper side of the table element 3 has a planar tabletop surface A, which is enclosed by a circumferential edge region R, so that the risk of an object placed on the tabletop surface A slipping off is at least substantially reduced. For example, the tabletop surface A has a length of 440 mm and a width of 200 mm.

In particular, the table element 3 has a height selected in such a way that the tabletop surface A is planar, wherein the underside is curved. An edge region R of the table element 3 facing away from the front passenger 2 is also curved in accordance with the guide F.

For example, the edge region R facing the front passenger 2 has a height of 3.5 mm, for example, and the edge region R facing away from the front passenger 2 has a height of 6 mm, for example, due to its curvature. A lateral edge region R enclosing the tabletop surface A is also curved and has a height of 20 mm, for example, at its highest point.

Figure 3:
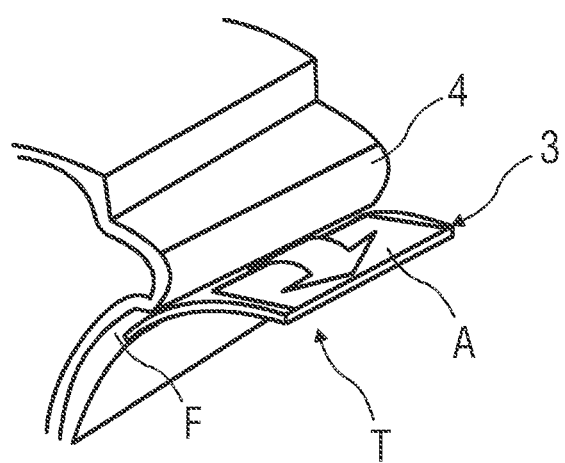
FIG. 3, schematically, is a perspective view of an instrument panel with extended table element.
Figure 5:
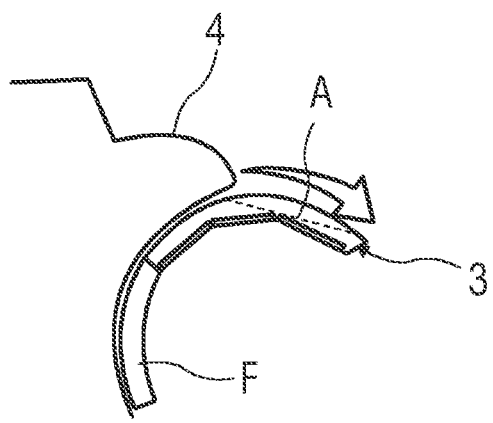
FIG. 5, schematically, is a sectional view of a side view of the instrument panel with the table element positioned in the use position.
Figure 6:
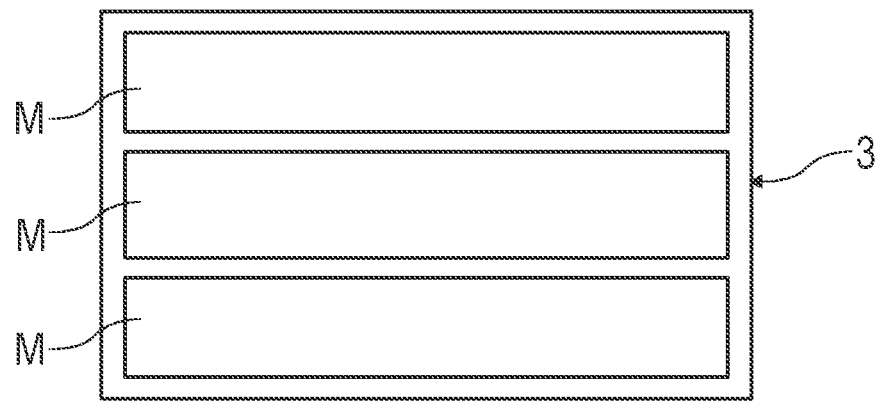
FIG. 6, schematically, shows an underside of the table element.

FIG. 3 shows a perspective view of a detail of the instrument panel 4 with the table element 3 extended, i.e., positioned in the use position, and FIG. 4 shows a sectional depiction of a side view of the instrument panel 4 with the table element 3 in the non-use position and in FIG. 5 in the use position.

When the table element 3 is positioned in the non-use position, one end side, i.e., the edge region R facing the passenger 2, and the underside of the table element 3 are visible.

In particular, when the table element 3 is in the non-use position, it functions as a so-called load distributor in the event of a collision of the vehicle 1. For this purpose, forces acting on the table element 3 by the front passenger 2 due to a collision are distributed, absorbed and dissipated in a controlled manner by means of a geometric and material design of the underside of the table element 3. The table element 3 thus represents a so-called load distribution plate.

In order to realize the distribution, absorption and dissipation of the forces, at least the underside of the table element 3 is made of a specifically adapted microsandwich material M, which combines a relatively tear-resistant surface with a core that fails in a targeted manner. This prevents sharp broken edges in the region of the passenger's legs 2 and at least reduces a load on the legs in the event of a collision.

The reduced load on the legs of the front passenger 2 by means of the table element 3 is relatively important especially in a so-called unbelted load case in connection with future harder collision impulses at a greater distance between the front passenger 2 and the instrument panel 4.

Figure 7:
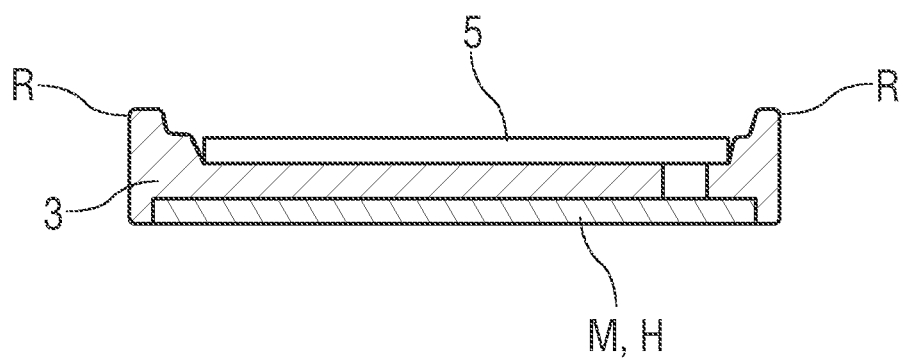
FIG. 7, schematically, is a sectional depiction of a side view of the table element.

In addition, a surface heater H shown as an example in FIG. 7 is integrated into the underside of the table element 3, by means of which heater the legs of the front passenger 2 can be heated in the use position of the table element 3. In particular, the surface heater H is integrated into a microsandwich structure of the table element 3 and is arranged close to the surface in such a way that a maximum amount of heat energy is radiated in the direction of the front passenger 2.

The tabletop surface A of the table element 3 can also be used as a work surface, so that writing can be done on it, for example. For example, a display unit, in particular a touch-sensitive display unit, can be integrated into the upper side of the table element 3 as a user interface and/or interface.

In addition, at least one electrical and/or electronic interface can be integrated into the table element 3 so that, for example, a keyboard can be connected and/or inductive charging of a mobile terminal, for example belonging to the front passenger 2, is possible. It can also be a standardised interface for data transmission between a mobile terminal and the display unit and/or the vehicle 1.

Furthermore, the table element 3 has mechanical interfaces (not shown in more detail), in particular as holding elements for fixing and fastening objects. For example, at least one ferromagnetic surface, hooks, eyelets and/or recesses are arranged or formed as holding elements on the table element 3.

It is also conceivable that a drink holder, a pen holder, a coin holder and/or a card holder is/are present on the table element 3, wherein such holding elements are integrated into the table element 3 in a possible embodiment in such a way that they are not visible when not in use, i.e., they can be retracted into the table element 3.

The invention claimed is:

1. A table device for an interior of a vehicle, the table device comprising:
   a table element with an underside comprising a tear-resistant microsandwich material having a tear-resistant surface and a core that fails in a targeted manner under collision so as to prevent the formation of sharp broken edges in a front passenger leg area,
   wherein the table element is configured to be positioned between a non-use position and a use position,
   wherein the table element is configured to be installed in a region of a front passenger instrument of the vehicle such that the underside of the table element faces a front passenger seat of the vehicle when in the non-use position.

2. The table device according to claim 1, further comprising a surface heater disposed on the underside of the table element.

3. The table device according to claim 1, further comprising a circular arc-shaped guide, wherein the table element is movable by a sliding movement along the circular arc-shaped guide for positioning the table element from the non-use position into the use position and from the use position into the non-use position.

4. The table device according to claim 3, wherein the sliding movement is executable solely manually, manually with spring force assistance, or electromechanically.

5. The table device according to claim 1, wherein an upper side of the table element has an edge region that surrounds a planar tabletop surface.

6. The table device according to claim 1, wherein an electrical and/or an electronic interface is integrated into the table element.

7. The table device according to claim 1, wherein the table element has a ferromagnetic surface and/or a plurality of holding elements.

8. The table device according to claim 1, wherein the table element has a holding element and wherein the holding element is a hook, an eyelet, or a recess.

9. The table device according to claim 1, further comprising an electronic display unit integrated into an upper side of the table element.

10. A vehicle, comprising:
   a table device, that includes a table element with an underside comprising a tear-resistant microsandwich material having a tear-resistant surface and a core that fails in a targeted manner under collision so as to prevent the formation of sharp broken edges in a front passenger leg area,
   wherein the table element is configured to be positioned between a non-use position and a use position,
   wherein the table element is configured to be installed in a region of a front passenger instrument of the vehicle such that the underside of the table element faces a front passenger seat of the vehicle when in the non-use position.

* * * * *